US007742832B1

(12) United States Patent
Feldman et al.

(10) Patent No.: US 7,742,832 B1
(45) Date of Patent: Jun. 22, 2010

(54) METHOD AND APPARATUS FOR WIRELESS DIGITAL AUDIO PLAYBACK FOR PLAYER PIANO APPLICATIONS

(75) Inventors: Theodore Philip Feldman, San Francisco, CA (US); David Andrew Rice, Syracuse, NY (US)

(73) Assignee: Neosonik, San Francisco, CA (US)

( * ) Notice: Subject to any disclaimer, the term of this patent is extended or adjusted under 35 U.S.C. 154(b) by 1206 days.

(21) Appl. No.: 11/030,698

(22) Filed: Jan. 5, 2005

Related U.S. Application Data

(60) Provisional application No. 60/535,457, filed on Jan. 9, 2004, provisional application No. 60/535,251, filed on Jan. 9, 2004.

(51) Int. Cl.
*G06F 17/00* (2006.01)

(52) U.S. Cl. ............................ 700/94; 84/610; 84/650; 84/666

(58) Field of Classification Search .................... 700/94
See application file for complete search history.

(56) References Cited

U.S. PATENT DOCUMENTS

| | | | | |
|---|---|---|---|---|
| 5,822,440 | A * | 10/1998 | Oltman et al. | 381/82 |
| 5,946,343 | A * | 8/1999 | Schotz et al. | 375/141 |
| 5,952,597 | A * | 9/1999 | Weinstock et al. | 84/609 |
| 6,026,150 | A * | 2/2000 | Frank et al. | 379/90.01 |
| 6,154,549 | A * | 11/2000 | Arnold et al. | 381/104 |
| 6,376,758 | B1 * | 4/2002 | Yamada et al. | 84/612 |
| 6,466,832 | B1 * | 10/2002 | Zuqert et al. | 700/94 |
| 6,653,545 | B2 * | 11/2003 | Redmann et al. | 84/615 |
| 6,671,494 | B1 * | 12/2003 | James | 455/66.1 |
| 6,864,413 | B2 * | 3/2005 | Shiiya | 84/610 |
| 6,956,162 | B2 * | 10/2005 | Koseki et al. | 84/609 |
| 6,981,208 | B2 * | 12/2005 | Milne et al. | 715/203 |
| 7,026,537 | B2 * | 4/2006 | Ishii | 84/617 |
| 7,297,859 | B2 * | 11/2007 | Ueki et al. | 84/613 |
| 2002/0072816 | A1 * | 6/2002 | Shdema et al. | 700/94 |
| 2002/0092411 | A1 * | 7/2002 | Shiiya | 84/609 |
| 2002/0108484 | A1 * | 8/2002 | Arnold et al. | 84/615 |
| 2002/0134222 | A1 * | 9/2002 | Tamura | 84/622 |
| 2002/0134224 | A1 * | 9/2002 | Umezawa et al. | 89/1.1 |
| 2003/0058148 | A1 * | 3/2003 | Sheen | 341/155 |
| 2003/0101862 | A1 * | 6/2003 | Furukawa | 84/610 |
| 2003/0135860 | A1 * | 7/2003 | Dureau | 725/82 |
| 2003/0151628 | A1 * | 8/2003 | Salter | 345/773 |
| 2003/0172798 | A1 * | 9/2003 | Fujiwara et al. | 84/609 |
| 2003/0177889 | A1 * | 9/2003 | Koseki et al. | 84/609 |

(Continued)

*Primary Examiner*—Curtis Kuntz
*Assistant Examiner*—Paul McCord
(74) *Attorney, Agent, or Firm*—Fenwick & West LLP

(57) ABSTRACT

The present invention discloses methods and systems for providing very high quality audio playback using all-digital wireless paths from a source to speaker transducers and/or headphones located anywhere within a distance allowed by the FCC. Each speaker has a separate digital amplifier dedicated to each transducer within it (e.g. woofer, tweeter). The present invention also discloses a system that provides a data link capable of sending an all-digital, full-bandwidth, signal from the original digital source material to each separate transducer in the system without using sound degrading lossy data compression. This system is designed to read, broadcast, and reproduce with accurate audio loudspeaker time-alignment (<100 uS) and low overall latency (less than 7 milliseconds) all popular audio formats in full-bandwidth and without data compression in the effort to maintain the integrity of the entire audio signal, wherein the audio signal may include an accompaniment to a player piano.

28 Claims, 3 Drawing Sheets

U.S. PATENT DOCUMENTS

2004/0091124 A1* 5/2004 Chua et al. .................. 381/104
2004/0106398 A1* 6/2004 Statham et al. ............. 455/420
2004/0223622 A1* 11/2004 Lindemann et al. ........... 381/79
2005/0044372 A1* 2/2005 Aull et al. ................... 713/176
2005/0053249 A1* 3/2005 Wu et al. .................... 381/310
2005/0060436 A1* 3/2005 Kienhoefer .................... 710/1
2005/0131558 A1* 6/2005 Braithwaite et al. ........... 700/94
2006/0098827 A1* 5/2006 Paddock et al. ............. 381/106

* cited by examiner

METHOD AND APPARATUS FOR WIRELESS DIGITAL AUDIO PLAYBACK FOR PLAYER PIANO APPLICATIONS

CROSS REFERENCE TO RELATED APPLICATIONS

This application claims the benefit of U.S. Provisional Applications No. 60/535,457 and 60/535,251 filed on Jan. 9, 2004, both of which are hereby incorporated herein by reference in their entirety.

BACKGROUND

1. Field of the Invention

The present invention relates in general to audio playback systems and in particular to methods and systems for playing audio from a digital source, wirelessly transferring the source data to a set of digital powered speakers or headphones.

2. Background of the Related Art

The concept of a player piano has been well known for many years. Until recently, player pianos have been built using electromechanical techniques, reading the music from rolls of punched paper. In the last decade or so, several companies have developed electronic player piano modules that can be attached to a standard piano. These modules typically read music data from a digital media, such as a floppy disk, CD-ROM, and actuate electromechanical solenoids to drive the keys on the piano.

More recently, companies have added audio playback capabilities to these player piano modules, so the piano can be automatically played while being accompanied by an arrangement of backup music. Often a popular artist's music is re-mixed without the solo piano and the player piano fills in the solo piano part.

Typically the audio playback portion of these systems is an afterthought, designed for convenient installation, but not for best sound quality. Furthermore, these systems, because they require wiring speakers back to the piano where the player piano controller resides, either mount the speakers to the piano, where the combined output of both the speaker and piano causes resonances that distort the sound of the piano and the speaker, or run wires across the floor to attach to an external audio or speaker system. Even when the physical running of the wires is not a problem, degradation of sound quality always takes place whenever an analog audio signal is transmitted down a conductor, regardless of whether gold, silver, copper or even exotic materials like carbon fiber are used. The audio cable industry has spent significant amounts of money developing new and purer conductive materials, such as "6-nines" copper (99.9999% pure) and experimented with a wide array of cable construction techniques and dielectrics such as teflon in the effort to reduce impedance mismatches, ringing, distortion, and smearing or roll-off of the audio signal's frequency response before it travels down a conductor to the next audio component.

Finally, when a player piano module is attached to a very high quality piano, it is especially important that the sound quality of the playback system be high enough to match the sound of the piano. Thus, there is a need for a system that provides enhanced flexibility in speaker placement and eliminates much more of the conventional systems wiring so that the audio can be delivered in as close to the original form as possible.

SUMMARY

The present invention provides a method and an apparatus for providing very high quality audio playback using all-digital paths from a source to speaker transducers, including a digital wireless link to connect the source controller to the speakers. The apparatus is a wireless digital audio playback system and comprises: a controller unit, which accepts a digital or analog audio input, or optionally includes a DVD/CD drive, a HD-DVD or Blu-ray drive, and generates a digitally encoded RF signal; and one or more wireless speaker units, each speaker unit including at least one antenna, at least one RF receiver, a digital crossover, one or more amplifiers (preferably class D amplifiers) and one or more speaker transducers. Due to its integrated nature, the apparatus provides better performance and lower cost than existing systems and can be used, for example, as an accompaniment system for player pianos or as the loudspeakers that playback the audio output of a digital or electric piano.

In one embodiment of the present invention, a digital wireless audio playback apparatus for playing an accompaniment to a player piano includes: an audio controller for receiving an input signal and broadcasting an output digital signal, the audio controller coupled to a player piano controller; and one or more wireless digital devices for receiving the output digital signal to play the accompaniment.

In another embodiment of the present invention, an audio controller for broadcasting a digital signal for a player piano includes: a digital signal processor for processing an input digital signal, the digital signal processor coupled to a player piano controller; an encoder for generating a digital bitstream in a native format of the input digital signal; an RF transmitter for modulating the digital bitstream; and an antenna for broadcasting the digital bitstream.

In still another embodiment of the present invention, a digital wireless speaker for playing an accompaniment to a player piano includes: at least one antenna for receiving a digital broadcast signal; at least one RF receiver for demodulating the digital broadcast signal to produce a digital bitstream; a decoder for decoding the digital bitstream; a digital signal processor for processing the digital bitstream; one or more amplifiers for receiving one or more digital audio signals from the digital signal processor, respectively; and one or more transducers coupled to the one or more amplifiers, respectively.

In yet another embodiment of the present invention, a method for playing an accompaniment to a player piano via wireless digital transmission includes steps of: receiving an input digital signal that includes the accompaniment; processing the input digital signal via a first digital signal processor; broadcasting the processed digital signal via a sending antenna; receiving the broadcast digital signal via a set of receiving antennas of a speaker, the broadcast digital signal including a bitstream in a native format of the input digital signal; processing the received digital signal via a second digital signal processor; sending a set of digital audio signals to a set of transducers of the speaker, respectively, the speaker configured to play the accompaniment.

In further another embodiment of the present invention, an audio system includes: a player piano; a player piano controller coupled to the player piano; an audio controller for receiving an input signal and broadcasting an output RF digital signal, the audio controller coupled to the player piano controller; and one or more wireless digital devices for receiving the output RF digital signal to play an accompaniment to the player piano in a native format of the input signal.

These and other advantages and features of the invention will become apparent to those persons skilled in the art upon reading the details of the invention as more fully described below.

DETAILED DESCRIPTION

Before the present systems and methods are described, it is to be understood that this invention is not limited to particular data, software, hardware or method steps described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

It must be noted that as used herein and in the appended claims, the singular forms "a", "an", and "the" include plural referents unless the context clearly dictates otherwise. Thus, for example, reference to "an amplifier" includes a plurality of such amplifiers and equivalents thereof known to those skilled in the art, and so forth.

The present invention may take multiple amplifiers per speaker approach as a starting point, but, in contrast to the existing systems, integrate the multiple amplifiers and speaker drivers into a single unit, so that the performance of the speakers in this system will be vastly superior to prior solutions. The use of integrated digital signal processors (DSP's) of the present invention to provide the crossover function and to tune each amplifier and speaker combination, may allow the manufacturer to achieve extremely high fidelity performance with relatively inexpensive parts. One of the major benefits of this approach may be that each speaker and its included amplifiers can be tuned as a system, and the tuning information can be store by the on-board DSP in a non-volatile memory, making each manufactured unit perform with the same high level of fidelity. In addition, by separating the channels to the individual speakers, the present invention may provide much better flexibility in speaker placement and eliminate much more of the systems wiring.

Unlike the existing few attempts at doing wireless audio that primarily focused on wireless technology, the present invention's combination of digital input, digital wireless transmission, digital crossover and filtering, and digital amplification may provide much higher quality sound than has been achieved to date. Such digital crossover and equalization can be set up to adjust the frequency response of each speaker driver to provide nearly flat response in the audio frequency range. The adjustment parameters can be stored in the speaker unit itself, allowing each speaker to have an individually optimized, nearly flat response.

Figure 1:
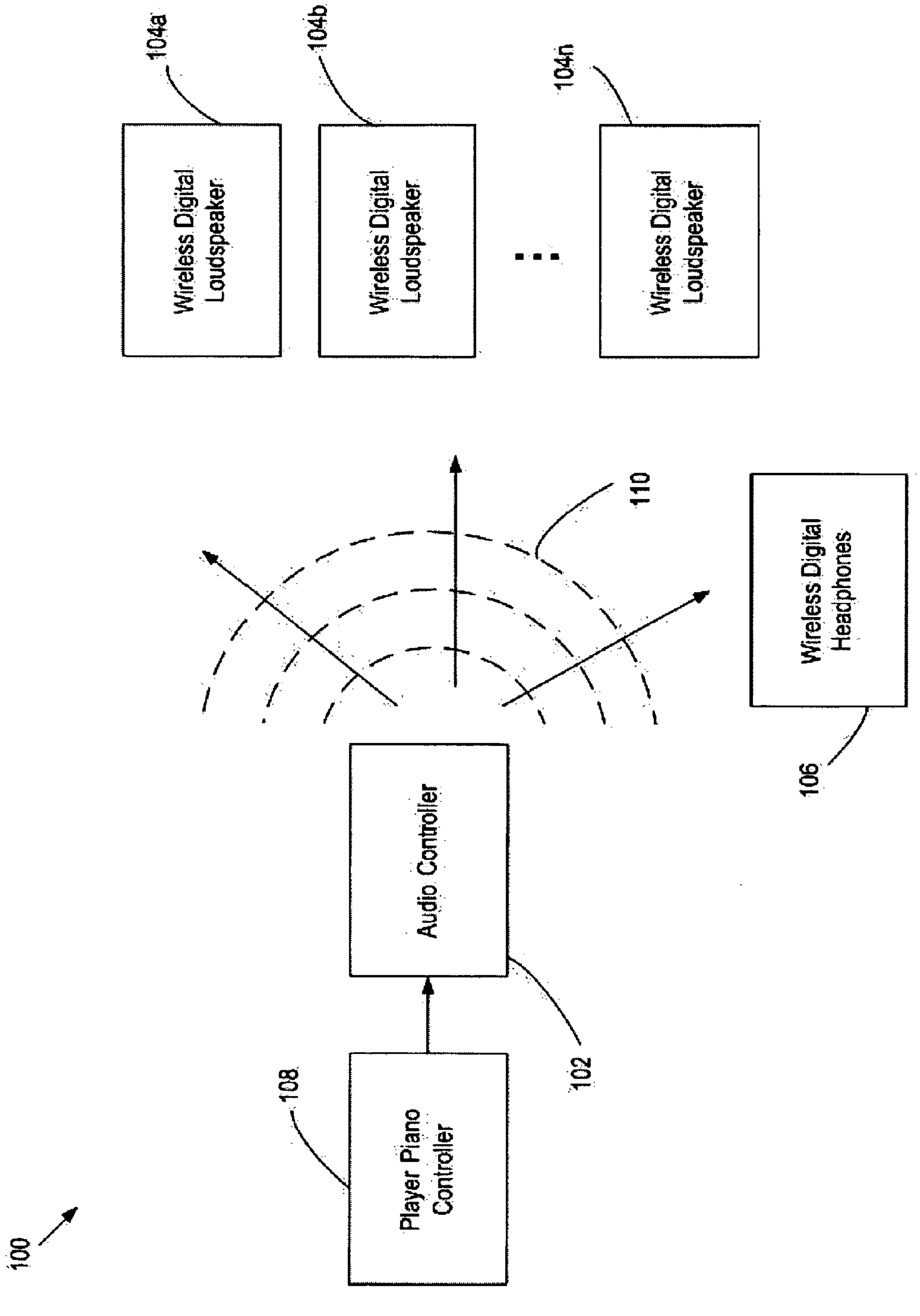
FIG. 1 is a schematic diagram of a digital wireless player piano playback apparatus, according to one embodiment of the present invention.

Referring now to FIG. 1, there is shown a digital wireless player piano playback apparatus 100, according to one embodiment of the present invention. The apparatus 100 comprises primary elements: an audio controller 102; one or more wireless digital loudspeakers 104*a-n*; and optionally one or more wireless digital headphones 106. In one embodiment, the audio controller 102 may connect via a cable to the audio output of a player piano controller 108, wherein the player piano controller 108 may send a digital or an analogue signal to the audio controller 102. In another embodiment, the player piano controller 108 may be integrated into the audio controller 102. The audio controller 102 may communicate the source data to the digital loudspeakers 104*a-n*, or digital headphones 106 via a wireless transmission 110. For clarity illustration, only one wireless digital headphone 106 is shown in FIG. 1. However, it should be apparent to those of ordinary skill that the present invention can be practiced with any number of wireless digital headphones.

It is noted that the present invention may be practiced with other types of pianos, such as a digital or electric piano. Thus, hereinafter, the term player piano collectively refers to various types of pianos that can be played by a controller.

Figure 2:
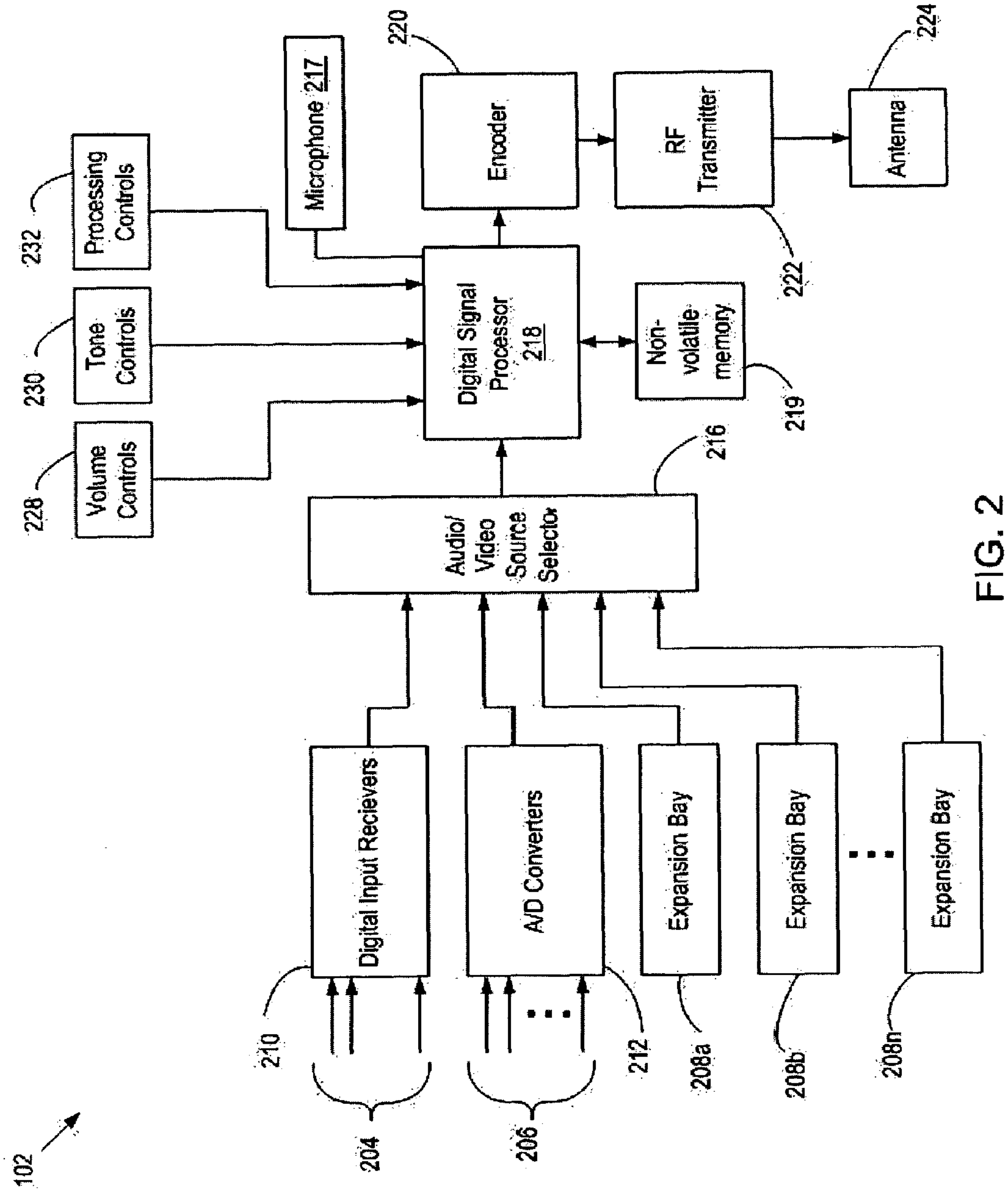
FIG. 2 is a schematic diagram of the audio controller shown in FIG. 1.

FIG. 2 is a schematic diagram of the audio controller 102 shown in FIG. 1. As illustrated in FIG. 2, the audio controller 102 comprises: one or more digital input receivers 210 for receiving one or more digital inputs 204; one or more A/D converters 212 for receiving one or more analogue inputs 206 and converting into digital signals; one or more internal modular expansion slots 208*a-n* for adding additional source capabilities such as an integrated player piano controller and CD ROM drive, DVD drive or a hard disk to store audio recordings; an audio/video source selector 216 for selecting one from multiple inputs; a digital signal processor 218 for processing the selected signal; an encoder 220 for encoding output signal from the DSP 218; a RF transmitter 222; and a sending antenna 224. The audio controller 102 may optionally accept and process digital music formats like CD, DVD, MP3 and Internet streaming, along with high-resolution formats like Super Audio Compact Disk (SACD) and DVD-A. Optionally, it may also accept surround sound formats such as from Dolby, THX and Digital Theater Systems (DTS).

The digital audio inputs 204 may enable the digital audio output of an external player piano controller 108 to be played by the apparatus 100 without extra D/A (digital to analog) conversion. These inputs 204 may be routed through the controller's digital audio receivers 210. The analog audio inputs 206 may include the analog audio output of an external player piano controller 108 and be routed through the controller's internal A/D converter 212.

An audio source selector 216 may control which of the inputs are provided to the digital signal processor (DSP) 218. In a preferred embodiment, this function may be performed in a field programmable gate array (FPGA) or application specific integrated circuit (ASIC). In an alternative embodiment, this can be implemented by any of a number of multiplexing circuits, such as analog multiplexer IC's, digital multiplexer IC's, combinations of discrete digital logic, or even simple relay or mechanical switches.

The audio controller 102 may take the digital source material and perform a variety of audio functions such as volume control, equalization (digital bass & treble, etc. controls as well as optional room correction) and/or surround sound processing in the digital domain via a DSP 218. The DSP 218 may perform the desired audio processing, and prepare the data for transmission. The digital encoder 220 may create a digital bitstream that combines the data of all of the music channels of the processed source material.

The encoder 220 may send the encoded bitstream to the RF transmitter 222, which modulates the data onto an RF signal. Then, the RF signal may be transmitted through an antenna 224. This multi-channel wireless broadcast system 100 may distribute digital audio data to a closed network of loudspeakers 104*a-n*, and/or headphones 106. In a preferred embodiment of the present invention, in order to broadcast audio full-bandwidth without compression, the wireless system's bandwidth capability may exceed 2.8 Mbps. In an alternative embodiment, lossless compression algorithms may be used to reduce this bandwidth without degradation, or lossy compression could be used if the degradation of the audio and/or video quality can be tolerated.

The audio controller 102 can broadcast signals within the constraints of federal communications commission (FCC) rules as far as 90 meters, thus giving it the ability to transmit to speakers throughout a user's home or facility. The wireless bandwidth may be divided into separate broadcast channels, meaning the audio controller 102 may broadcast different mixes to different loudspeakers, or headphones, throughout the user's home or facility. In one embodiment, this capability may be applied to microphones on the piano so that remote speakers in other rooms could include both the background mix and the piano. The primary limitation on the number and variety of sources broadcast may be the overall system bandwidth.

Various other controls may be included in the audio controller 102. Such controls may include volume controls 228, tone controls 230, and processing controls 232. These controls are optional as the audio controller 102 may be built with no controls, relying on the player piano controller 108 to control volume, etc. Preferably, if the player piano controller 108 is integrated into the system, then the controls for the player piano controller 108 may be included in the audio controller 102.

It is noted that the audio controller 102 may broadcast a RF digital bitstream that may have the native format of its signal input source and be either an aggregate (or, equivalently, multicast) data stream which contains all of the audio data and received by each node in the network which then strips out its required signal (such as left channel speaker and right channel speaker) or a so called point-to-multipoint stream where each data stream may be sent directly to its destination and is acknowledged by that destination. In contrast to conventional systems, the bitstream from the audio controller 102 is not compressed or buffered, which preserves the original quality of the input signal. Also, the audio signals carried in the bitstream can be separated and displayed simultaneously by the receiving devices, such as the digital loudspeakers 104*a-n* and wireless digital headphones 106.

Because the systems response can be altered by the acoustics of the room in which the loudspeakers 104*a-n* are operating, the controller 102 may use a microphone 217 coupled to the DSP 218 which creates a method for measuring and correcting these anomalies. The DSP 218 generates a series of test tones that are played back by each of the loudspeakers 104*a-n*. The microphone 217 measures the response for each loudspeaker in that particular room and sends this data back to the DSP 218. The DSP 218 calculates a new frequency response correction curve for each loudspeaker that reduces these room anomalies and stores this data in the non-volatile memory 219. After this correction routine has been accomplished, each loudspeaker reproduces a new frequency response curve that has been adjusted from the original factory setting to incorporate any frequency response anomalies presented by that particular room.

Figure 3:
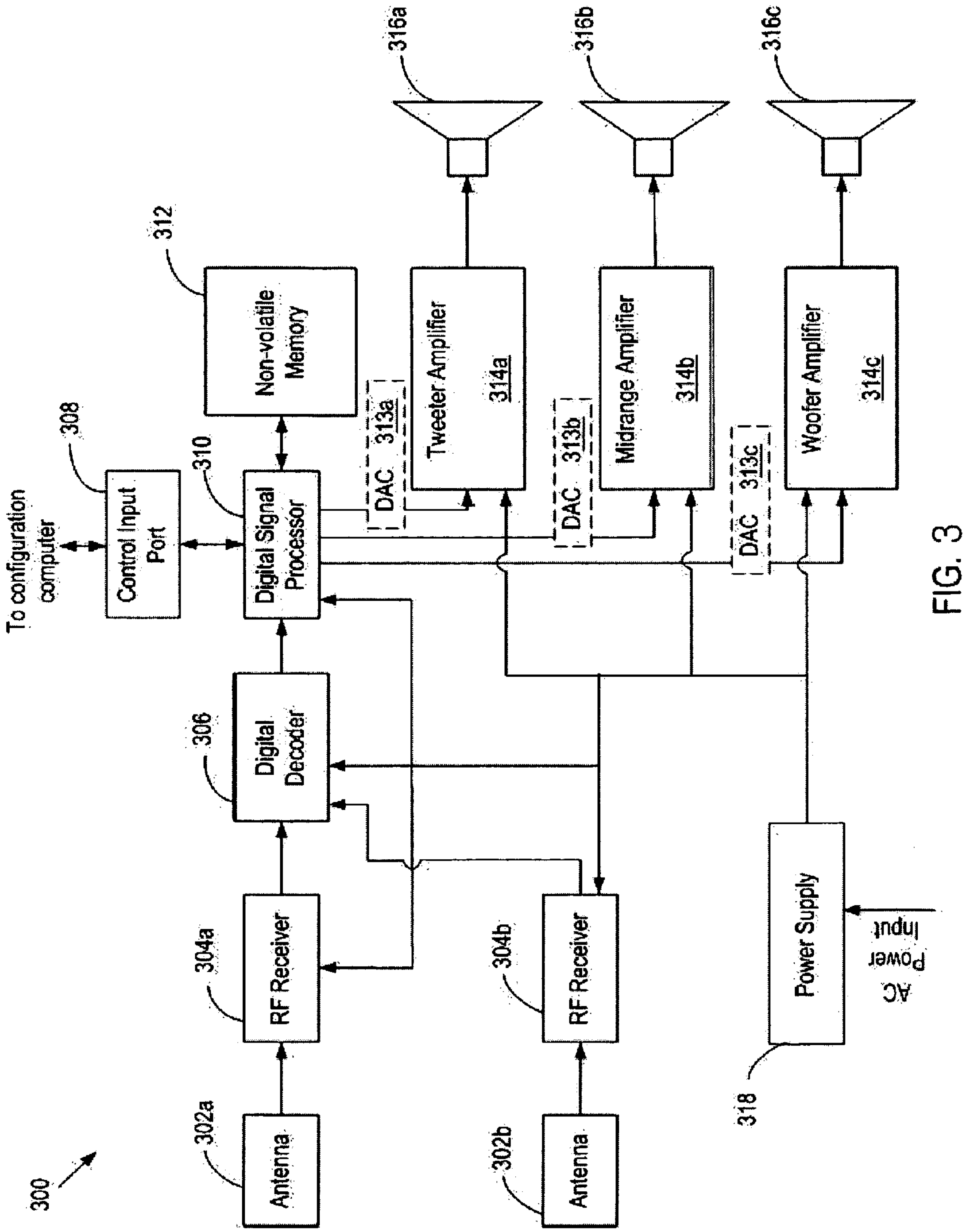
FIG. 3 is a schematic diagram of one embodiment of the wireless digital loudspeaker shown in FIG. 1.

Referring now to FIG. 3, there is shown a schematic diagram of one embodiment 300 of the wireless digital loudspeaker 104 shown in FIG. 1. The digital loudspeaker 300 may comprise: one or more receiving antennas 302*a-b*; one or more RF receivers 304*a-b*; a digital decoder 306; a digital signal processor 310; a non-volatile memory 312 coupled to the digital signal processor 310; one or more amplifiers including a tweeter amplifier 314*a*, a midrange amplifier 314*b* and a woofer amplifier 314*c*; one or more speaker transducers 316*a-c* coupled to the amplifiers 314 *a-c*, respectively; and one or more power supplies 318. For simplicity, only three sets of amplifiers 314*a-c* and transducers 316*a-c* are shown in FIG. 4. However, it should be apparent to those of ordinary skill that the loudspeaker 300 may have any number of amplifiers and transducers without deviating from the present teachings.

The wireless loudspeakers 300 can use spatial diversity for providing continuous service in the presence of multipath. To this end, the loudspeaker 300 may include several antennas 302 and RF receivers 304. The output of each receiver 304 may be a bitstream that mirrors the bitstream encoded in the audio controller 102. The bitstream may be in a native format of the original input to the audio controller 102 and not compressed or buffered. The bitstreams from the receivers 304*a-b* may be passed to the digital decoder 306, which decodes the bitstream into its separate audio components. The audio data may be then sent into the DSP 310 for further processing. The decoder 306 may preferably be implemented in an FPGA or ASIC.

The DSP 310 may select which portion of the audio data will be processed. In a stereo signal, a speaker will process the left or right channel. In a surround sound signal, a speaker will select from among the multiple channels. The selection of which signal is used can be controlled through some form of user or factory settable switch or jumper, or through a software configuration stored in non-volatile memory 312. The DSP 310 may filter the signal to correct the frequency response of the speaker. Then, it may break the equalized signal into signals tailored for individual transducers 316*a-c*. This may be done by performing crossover, phase matching, and time alignment filtering function in a digital implementation. The filtering options available to a DSP processor 310 may be far more numerous and more controllable than those available through analog filtering techniques. In one embodiment, the crossover filtering may be done using finite impulse response filters. In another embodiment, crossover filtering may be done using infinite impulse response (IIR) filters.

The output of the DSP 310 may be a set of digital signals, one for each speaker transducer 316. These signals may be directed to the inputs of digital amplifiers 314*a-c*. In conventional systems, typical speaker amplifiers receive analogue signals. In contrast, the amplifiers 314*a-c* may be designed to take digital audio input and generate a high power output signal that drives the transducers 316*a-c* to produce an accurate reproduction of the original source material. In one embodiment, each of the amplifiers 314*a-c* may be a class D audio amplifier that may comprise one or more integrated and discrete circuits per transducer. In another embodiment, each of the amplifiers 314*a-c* may be a class A or A/B to have an analog format. In this embodiment, the loudspeaker 300 may optionally include D/A converter chip (DAC) 313*a-c* interposed between the DSP 310 and the amplifiers 314*a-c*, respectively. In another embodiment, one or more transducers may be driven by a single integrated circuit. Other types of amplifiers could be used for this function. By eliminating the passive crossover and dedicating a separate digital amplifier to each transducer, a full-bandwidth discrete path may be created all the way back to the digital source material.

In one embodiment of the present invention, the functions of DSP 310 could be integrated into the digital amplifiers 314*a-c*. The digital amplifiers 314*a-c* could be a single integrated circuit per channel, or could be a multichannel amplifier, with or without DSP functions integrated.

A series of loudspeakers designed for specific applications such as Left and Right Channels, Center Channels, Surround Channels and Subwoofers can be used to capture the wireless digital audio data and convert it into sound pressure. In a preferred embodiment of the present invention, each loudspeaker 300 may have a cabinet that includes an amplifier plate mounted on the back. This amp plate may hold all of the speaker's electronics. The plate may include a detachable power cord and a proprietary control input port 308. This control port 308 may be used during final assembly to program the DSP 310 of each loudspeaker 300. During this final test procedure, a loudspeaker's characteristics may be measured and then corrected to match the desired final design standard. These corrections may be sent into the speaker 300 and stored in a non-volatile memory 312 by the speaker's DSP 310, via the control input port 308. This ensures that a speaker that leaves the production line is DSP-corrected to match the production standard.

Antennas 302*a-b* placed within or on the rear of the loudspeaker enclosure may capture the full-bandwidth digital audio broadcast from the audio controller 102. Digital wireless headphones 106 capable of receiving the full-bandwidth signal from the controller can also be added to the system 100.

The wireless digital headphones 106 may be a subset of the wireless digital loudspeaker 300, where there are only two amplifiers and transducers, one for each side of the headset. Crossovers are not required in this application, since only a single transducer is used per channel.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

What is claimed is:

1. A digital wireless audio playback apparatus for playing an accompaniment to a player piano, the player piano having a player piano controller providing a player piano controller audio output, and controlled by player piano instructions, the apparatus comprising:

an audio controller, coupled to the player piano controller for receiving as an input signal the player piano controller audio output of accompanying audio previously synchronized to a player piano system comprising the player piano, and broadcasting an output RF digital audio signal; and one or more wireless digital devices for receiving the output RF digital audio signal to play the accompaniment, wherein the output RF digital audio signal received by the one or more wireless digital devices, and the player piano instructions used by the player piano controller remain synchronized between the player piano and the output from the one or more wireless digital devices with an overall latency of less than 7 milliseconds and an audio time alignment between the output of each of the one or more wireless digital devices of less than 100 microseconds.

2. The digital wireless playback apparatus of claim 1, wherein the one or more wireless digital devices include one or more wireless digital loudspeakers, at least one wireless digital headphone, or any combination thereof.

3. The digital wireless playback apparatus of claim 1, wherein the one or more wireless digital devices play the accompaniment in a native format of the audio signal.

4. An audio controller for broadcasting a digital audio signal for an accompaniment to a player piano, the player piano having a player piano controller providing a player piano controller audio output to the audio controller, and controlled by player piano instructions, the audio controller, comprising:

a digital signal processor for processing an input digital signal of accompanying audio previously synchronized to a player piano system comprising the player piano, the digital signal processor coupled to the player piano controller of the player piano system;

an encoder for generating a digital bitstream in a native format of the input digital signal;

an RF transmitter for modulating the digital bitstream; and an antenna for broadcasting the digital bitstream, wherein said audio controller provides synchronization between the broadcast digital bitstream and the player piano instructions used by the player piano controller, with an audio time alignment of less than 100 microseconds and an overall latency of less than 7 milliseconds.

5. The audio controller of claim 4, further comprising:

one or more digital input devices adapted to be coupled to one or more digital signal sources to receive respective digital signals; and a selector for selecting an input signal from one or more digital signal sources signals.

6. The audio controller of claim 5, further comprising: one or more A/D converters coupled to one or more analogue signal sources; and the selector further selecting an output digital signal from the A/D converters.

7. The audio controller of claim 5, wherein the selector includes a field programmable gate array (FPGA) or an application specific integrated circuit (ASIC).

8. The audio controller of claim 5, wherein the selector includes a multiplexing circuit.

9. The audio controller of claim 8, wherein the multiplexing circuit is an analog multiplexer IC, a digital multiplexer IC, a combination of discrete digital logic, a simple relay or a mechanical switch and any combination thereof.

10. The audio controller of claim 4, further comprising a set of controls coupled to the digital signal processor, wherein the set of controls include a volume control, a tone control, a processing control or any combination thereof.

11. The audio controller of claim 4, further comprising a non-volatile memory that is coupled to the digital signal processor and configured to store program code to control the digital signal processor.

12. The audio controller of claim 4, further comprising a microphone coupled to the digital signal processor.

13. A digital wireless speaker for playing an accompaniment to a player piano, comprising:

at least one antenna for receiving a digital broadcast signal;

at least one RF receiver for demodulating the digital broadcast signal to produce a digital bitstream;

a decoder for decoding the digital bitstream;

a digital signal processor for processing the digital bitstream;

one or more amplifiers for receiving one or more digital audio signals from the digital signal processor, respectively; and one or more transducers coupled to the one or more amplifiers, respectively; wherein said digital wireless speaker provides synchronization between the one or more digital audio signals and the player piano, with an audio time alignment of less than 100 microseconds and an overall latency of less than 7 milliseconds.

14. The digital wireless speaker of claim 13, further comprising a non-volatile memory that is coupled to the digital signal processor and configured to store program code to control the digital signal processor.

15. The digital wireless speaker of claim 14, further comprising a control input port interposed between the digital signal processor and a configuration computer that executes the program code.

16. The digital wireless speaker of claim 13, wherein the one or more amplifiers include a tweeter amplifier, a midrange amplifier, a woofer amplifier, or any combination thereof.

17. The digital wireless speaker of claim 13, wherein the digital bitstream is an aggregate data stream or a point-to-multipoint stream.

18. The digital wireless speaker of claim 13, wherein each of the one or more amplifiers is a class D amplifier.

19. The digital wireless speaker of claim 13, wherein the DSP includes one or more crossover filters, and wherein the one or more crossover filters include finite impulse response filters (FIR), infinite impulse response (IIR) filters, or any combination thereof.

20. The digital wireless speaker of claim 13, wherein the decoder is implemented in a field programmable gate array (FPGA) or an application specific integrated circuit (ASIC).

21. A method for playing an accompaniment to a player piano via wireless digital transmission, comprising;

receiving an input digital signal that includes accompanying audio previously synchronized to a player piano system comprising the player piano, the player piano having a player piano controller controlled by player piano instructions;

processing the input digital signal via a first digital processor;

broadcasting the processed digital signal via a sending antenna;

receiving the broadcast digital signal via a receiving antenna of a speaker, the broadcast digital signal including a bitstream in a native format of the input digital signal;

processing the received digital signal via a second digital signal processor; and sending a set of digital audio signals to a set of transducers of the speaker, wherein said set of digital audio signals and the player piano instructions are synchronized with an audio time alignment of less than 100 microseconds and an overall latency of less than 7 milliseconds.

22. The method of claim 21, wherein the step of receiving an input signal comprises: receiving one of more source signals from one or more sources; and selecting the input digital signal from the one or more source signals.

23. The method of claim 21, further comprising, prior to the step of broadcasting the processed digital signal: encoding the processed digital signal; and modulating the process digital signal to produce a RF digital bitstream.

24. The method of claim 21, further comprising, prior to the step of processing the received digital signal; decoding the received digital signal; and demodulating the received digital signal.

25. The method of claim 21, wherein the step of processing the input signal comprises the step of providing a set of control signals to the first digital signal processor, and wherein the set of control signals include a volume control signal, a tone control signal, a processing control signal, or any combination thereof.

26. An audio system, comprising;

a player piano;

a player piano controller coupled to the player piano to control an output of the player piano according to player piano instructions;

an audio controller for receiving an input signal of accompanying audio previously synchronized to a player piano system and broadcasting an output RF digital signal, the audio controller coupled to the player piano controller; and one or more wireless digital devices for receiving the output RF digital signal to play an accompaniment to the player piano in a native format of the input signal, wherein the output RF digital signal and the player piano instructions are synchronized with an audio time alignment of less than 100 microseconds and an overall latency of less than 7 milliseconds.

27. The audio system of claim 26, wherein the one or more wireless digital devices operate synchronously and include one or more wireless digital loudspeakers, at least one wireless digital headphone, or any combination thereof.

28. The audio system of claim 26, wherein the player piano is a digital piano or an electric piano.

* * * * *

UNITED STATES PATENT AND TRADEMARK OFFICE

CERTIFICATE OF CORRECTION

PATENT NO. : 7,742,832 B1
APPLICATION NO. : 11/030698
DATED : June 22, 2010
INVENTOR(S) : Theodore Philip Feldman et al.

It is certified that error appears in the above-identified patent and that said Letters Patent is hereby corrected as shown below:

Column 10, line 7, after “one,” delete “of”, add “or”.

Column 10, line 19, after “input,” add “digital”.

Signed and Sealed this
Twenty-ninth Day of March, 2011

David J. Kappos
*Director of the United States Patent and Trademark Office*